United States Patent
Deshpande et al.

(10) Patent No.: US 10,891,380 B1
(45) Date of Patent: Jan. 12, 2021

(54) FRAMEWORK TO QUANTIFY DEVIATIONS IN APP PERMISSIONS USING APPLICATION DESCRIPTION

(71) Applicant: McAfee, LLC, Santa Clara, CA (US)

(72) Inventors: Rahul Deshpande, Santa Clara, CA (US); Ameya Sanzgiri, Sunnyvale, CA (US)

(73) Assignee: McAfee, LLC, San Jose, CA (US)

( * ) Notice: Subject to any disclaimer, the term of this patent is extended or adjusted under 35 U.S.C. 154(b) by 255 days.

(21) Appl. No.: 15/926,000

(22) Filed: Mar. 20, 2018

Related U.S. Application Data (60) Provisional application No. 62/474,191, filed on Mar. 21, 2017.

(51) Int. Cl.
  *G06F 21/00* (2013.01)
  *G06F 21/57* (2013.01)
  *G06F 8/61* (2018.01)

(52) U.S. Cl.
  CPC .............. *G06F 21/57* (2013.01); *G06F 8/61* (2013.01); *G06F 2221/033* (2013.01)

(58) Field of Classification Search
  CPC ....... G06F 21/57; G06F 8/61; G06F 2221/033
  See application file for complete search history.

(56) References Cited

U.S. PATENT DOCUMENTS

| | | | | |
|---|---|---|---|---|
| 9,369,433 B1* | 6/2016 | Paul | | G06F 21/572 |
| 10,198,597 B2* | 2/2019 | Ekambaram | | G06F 21/629 |
| 10,204,225 B2* | 2/2019 | Chen | | G06F 21/57 |
| 2005/0283622 A1* | 12/2005 | Hall | | G06F 21/51 |
| | | | | 713/190 |
| 2006/0047605 A1* | 3/2006 | Ahmad | | H04L 63/105 |
| | | | | 705/64 |
| 2012/0240183 A1* | 9/2012 | Sinha | | H04W 12/08 |
| | | | | 726/1 |
| 2012/0240236 A1* | 9/2012 | Wyatt | | G06F 21/564 |
| | | | | 726/25 |
| 2013/0318613 A1* | 11/2013 | Archer | | G06F 21/577 |
| | | | | 726/25 |
| 2014/0026179 A1* | 1/2014 | Devarajan | | G06F 21/51 |
| | | | | 726/1 |
| 2014/0137264 A1* | 5/2014 | Bilogrevic | | G06F 21/54 |
| | | | | 726/27 |
| 2014/0214610 A1* | 7/2014 | Moshir | | G06Q 20/4016 |
| | | | | 705/26.35 |
| 2014/0289859 A1* | 9/2014 | Archer | | G06F 21/577 |
| | | | | 726/25 |

(Continued)

*Primary Examiner* — Don G Zhao
(74) *Attorney, Agent, or Firm* — Byrne Poh LLP (57) ABSTRACT

Methods, systems, and media for determining application permissions are provided. In some embodiments, the method comprises: receiving a description of an application to be installed on a user device and a group of permissions required by the application; identifying a subset of words in the description of the application; determining an expected group of permissions based on the subset of words; comparing the group of permissions required by the application and the expected group of permissions; determining a privacy score associated with the application based on the comparison of the group of permissions required by the application and the expected group of permissions; and causing the application to be installed on the user device based on the privacy score associated with the application.

10 Claims, 6 Drawing Sheets

(56) References Cited

U.S. PATENT DOCUMENTS

| | | | |
|---|---|---|---|
| 2015/0242635 A1* | 8/2015 | Li | G06F 21/577 726/25 |
| 2015/0326613 A1* | 11/2015 | Devarajan | G06F 16/21 726/1 |
| 2016/0099963 A1* | 4/2016 | Mahaffey | H04L 63/145 726/25 |
| 2016/0156646 A1* | 6/2016 | Hsueh | G06F 21/563 726/1 |
| 2016/0188883 A1* | 6/2016 | Wang | G06F 21/577 726/25 |
| 2018/0137281 A1* | 5/2018 | Akiyama | G06F 21/566 |

* cited by examiner

FIG. 6 ured to: receive a description of an application to be installed
FRAMEWORK TO QUANTIFY DEVIATIONS IN APP PERMISSIONS USING APPLICATION DESCRIPTION

CROSS-REFERENCE TO RELATED APPLICATION

This application claims the benefit of U.S. Provisional Patent Application No. 62/474,191, filed on Mar. 21, 2017, which is hereby incorporated by reference herein in its entirety.

TECHNICAL FIELD

Embodiments described herein generally relate to computer security and privacy and, more particularly, to a framework to quantify deviations in app permissions using application descriptions.

BACKGROUND

The field of computer network security has become increasingly important and complicated in today's society. Computer network environments are configured for virtually every enterprise or organization, typically with multiple interconnected computers (e.g., end user computers, laptops, servers, printing devices, etc.). In many such enterprises, Information Technology (IT) administrators may be tasked with maintenance and control of the network environment, including executable software files (e.g., web application files) on hosts, servers, and other network computers. As the number of executable software files in a network environment increases, the ability to control, maintain, and remediate these files efficiently can become more difficult. Furthermore, computer and communications networks today encompass mobile devices such as smartphones, tablet computers and the like, which allow users to download and install applications on these devices quickly and with minimal oversight. Thus, innovative tools are needed to assist IT administrators in the effective control and management of applications on mobile devices within computer and communication network environments.

Privacy tools attempt to help users decide whether to install or allow an app permission to access information or services. Such tools typically attempt to assess an app based on a weighted score for permissions requested by the app or by categorizing apps based on functionality and whether the requested permissions are generally requested by other apps of that category. However, weighted scores may not take into account various features offered by an app. It may also be difficult to accurately categorize apps, as an app may include a variety of possibly unrelated services. Additionally, such categorization typically is done manually, which may be expensive, time consuming, subjective, and possibly limited by language barriers. What is needed is a framework to quantify deviations in app permission using application descriptions. Such a framework may help preserve user privacy and help secure devices and communication network environments by providing an actionable framework for scoring an appropriateness of permissions requested by an app based on the description of the app.

SUMMARY

Methods, systems, and media for determining application permissions are provided. In accordance with some embodiments of the disclosed subject matter, a method for determining application permissions is provided, the method comprising: receiving a description of an application to be installed on a user device and a group of permissions required by the application; identifying a subset of words in the description of the application; determining an expected group of permissions based on the subset of words; comparing the group of permissions required by the application and the expected group of permissions; determining a privacy score associated with the application based on the comparison of the group of permissions required by the application and the expected group of permissions; and causing the application to be installed on the user device based on the privacy score associated with the application.

In accordance with some embodiments of the disclosed subject matter, a system for determining application permissions is provided, the system comprising: a memory; and a hardware processor coupled to the memory that is configured to: receive a description of an application to be installed on a user device and a group of permissions required by the application; identify a subset of words in the description of the application; determine an expected group of permissions based on the subset of words; compare the group of permissions required by the application and the expected group of permissions; determine a privacy score associated with the application based on the comparison of the group of permissions required by the application and the expected group of permissions; and cause the application to be installed on the user device based on the privacy score associated with the application.

In accordance with some embodiments of the disclosed subject matter, a non-transitory computer-readable medium containing computer readable instructions that, when executed by a processor, cause the processor to perform a method for determining application permissions is provided, the method comprising: receiving a description of an application to be installed on a user device and a group of permissions required by the application; identifying a subset of words in the description of the application; determining an expected group of permissions based on the subset of words; comparing the group of permissions required by the application and the expected group of permissions; determining a privacy score associated with the application based on the comparison of the group of permissions required by the application and the expected group of permissions; and causing the application to be installed on the user device based on the privacy score associated with the application.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Privacy tools attempt to help users decide whether to install or allow an app to access information or services. To help address privacy concerns, mobile devices may include a set of permission abstractions for controlling access to certain information or services. For example, a mobile device may ask a user for permission when installing an app to allow the app to access a camera on the device or a contacts list on the device. Generally, asking the user for permission requires that the user understand the services and functionality provided by the app and weigh the potential privacy implications. However, users may have difficulty accurately assessing privacy implications as the user may not fully understand the services and functionality of an app having, for example, novel features as compared to an app requiring an unnecessary abstraction and thus having potentially unwanted privacy concerns.

A framework to quantify deviations in app permission using application descriptions helps address such difficulties by providing a mechanism by which app stores or users can obtain information related to privacy implications of an app based on functionality the app claims to provide, as indicated by the app description. This information may be presented to the user, for example, as a score, color code, or other indication, to assist the user to decide whether to obtain or continue running the app. In some cases, the information may also be used to make a decision whether to allow an app into an app store, for example, during a submissions process.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a programmable device" can refer to a single programmable device or a plurality of programmable devices working together to perform the function described as being performed on or by the programmable device. Similarly, "a machine-readable medium" can refer to a single physical medium or a plurality of media that together may store the material described as being stored on the machine-readable medium.

Figure 1:
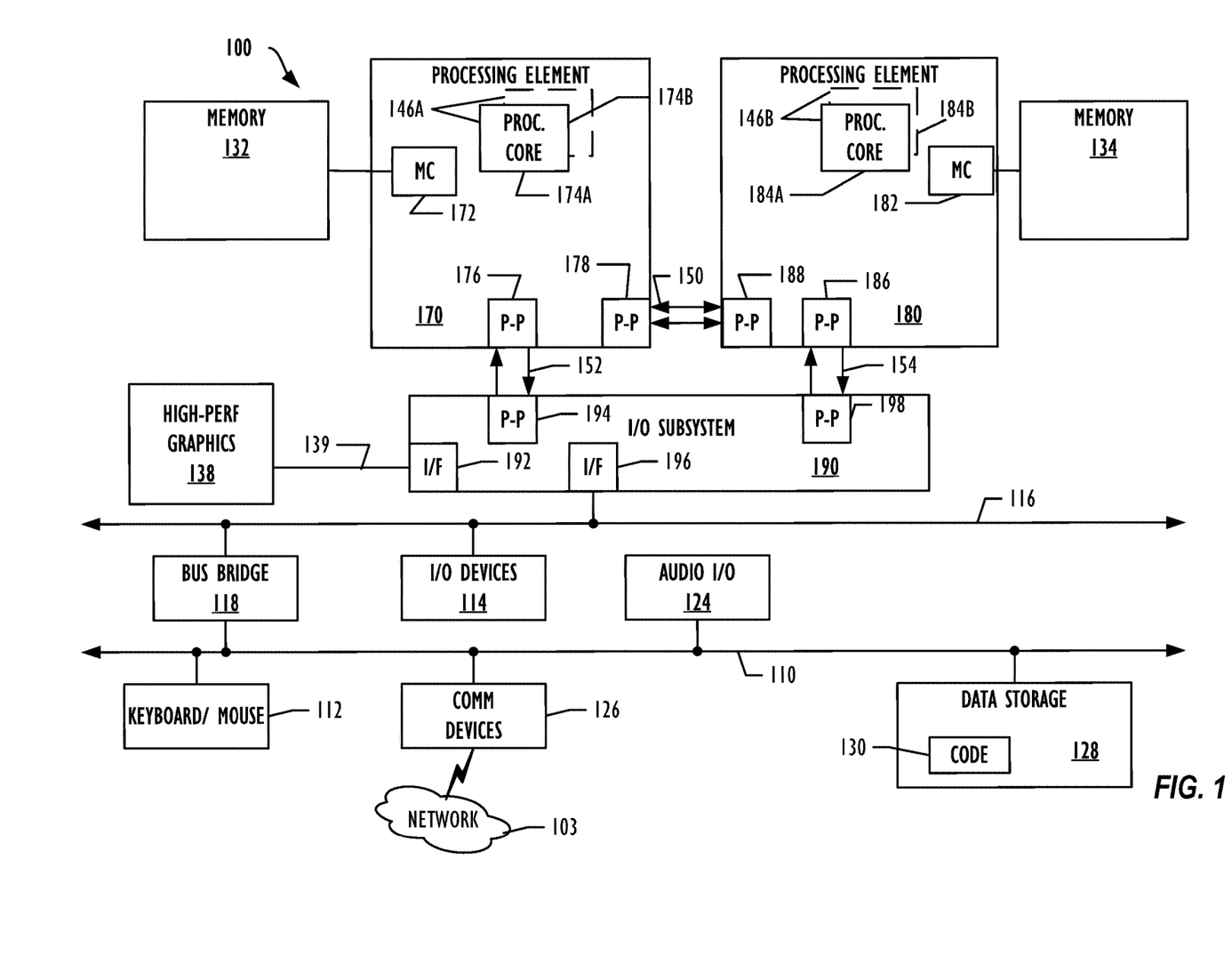
FIG. 1 is an example of a block diagram illustrating a programmable device, according to some embodiments.

Referring now to FIG. 1, an example of a block diagram illustrates a programmable device 100 that may be used for implementing the techniques described herein in accordance with some embodiments. Programmable device 100 illustrated in FIG. 1 is a multiprocessor programmable device that includes a first processing element 170 and a second processing element 180. While two processing elements 170 and 180 are shown, an embodiment of programmable device 100 may also include only one such processing element.

Programmable device 100 is illustrated as a point-to-point interconnect system, in which first processing element 170 and second processing element 180 are coupled via a point-to-point interconnect 150. Any or all of the interconnects illustrated in FIG. 1 may be implemented as a multi-drop bus rather than point-to-point interconnects.

As illustrated in FIG. 1, each of processing elements 170 and 180 may be multicore processors, including first and second processor cores (i.e., processor cores 174a and 174b and processor cores 184a and 184b). Such cores 174a, 174b, 184a, 184b may be configured to execute instruction code. However, other embodiments may use processing elements that are single core processors as desired. In embodiments with multiple processing elements 170, 180, each processing element may be implemented with different numbers of cores as desired.

Each processing element 170, 180 may include at least one shared cache 146. Shared cache 146a, 146b may store data (e.g., instructions) that are utilized by one or more components of the processing element, such as cores 174a, 174b and 184a, 184b, respectively. For example, the shared cache may locally cache data stored in a memory 132, 134 for faster access by components of the processing elements 170, 180. In one or more embodiments, shared cache 146a, 146b may include one or more mid-level caches, such as level 2 (L2), level 3 (L3), level 4 (L4), or other levels of cache, a last level cache (LLC), or combinations thereof.

While FIG. 1 illustrates a programmable device with two processing elements 170 and 180 for clarity of the drawing, the scope of the present invention is not so limited and any number of processing elements may be present. Alternatively, one or more of processing elements 170 and/or 180 may be an element other than a processor, such as a graphics processing unit (GPU), a digital signal processing (DSP) unit, a field programmable gate array, or any other programmable processing element. Processing element 180 may be heterogeneous or asymmetric to processing element 170. There may be a variety of differences between processing elements 170, 180 in terms of a spectrum of metrics of merit including architectural, microarchitectural, thermal, power consumption characteristics, and the like. These differences may effectively manifest themselves as asymmetry and heterogeneity amongst processing elements 170 and/or 180. In some embodiments, the various processing elements 170 and/or 180 may reside in the same die package.

First processing element 170 may further include memory controller logic (MC) 172 and point-to-point (P-P) interconnects 176 and 178. Similarly, second processing element 180 may include a MC 182 and P-P interconnects 186 and 188. As illustrated in FIG. 1, MCs 172 and 182 couple processing elements 170 and/or 180 to respective memories, namely a memory 132 and a memory 134, which may be portions of main memory locally attached to the respective processors. While MC logic 172 and 182 is illustrated as integrated into processing elements 170 and/or 180, in some embodiments the memory controller logic may be discrete logic outside processing elements 170 and/or 180 rather than integrated therein.

Processing element 170 and processing element 180 may be coupled to an I/O subsystem 190 via respective P-P interconnects 176 and 186 through links 152 and 154. As illustrated in FIG. 1, I/O subsystem 190 includes P-P interconnects 194 and 198. Furthermore, I/O subsystem 190 includes an interface 192 to couple I/O subsystem 190 with a high performance graphics engine 138. In one embodiment, a bus (not shown) may be used to couple graphics engine 138 to I/O subsystem 190. Alternately, a point-to-point interconnect 139 may couple these components.

In turn, I/O subsystem 190 may be coupled to a first link 116 via an interface 196. In one embodiment, first link 116 may be a Peripheral Component Interconnect (PCI) bus, or a bus such as a PCI Express bus or another I/O interconnect bus, although the scope of the present invention is not so limited.

As illustrated in FIG. 1, various I/O devices 114 and/or 124 may be coupled to first link 116, along with a bridge 118 that may couple first link 116 to a second link 110. In one embodiment, second link 120 may be a low pin count (LPC) bus. Various devices may be coupled to second link 120 including, for example, a keyboard/mouse 112, communication device(s) 126 (which may in turn be in communication with the computer network 103), and a data storage unit 128 such as a disk drive or other mass storage device which may include code 130, in one embodiment. Code 130 may include instructions for performing embodiments of one or more of the techniques described above. Further, an audio I/O 124 may be coupled to second link 110.

Note that other embodiments are contemplated. For example, instead of the point-to-point architecture of FIG. 1, a system may implement a multi-drop bus or another such communication topology. Although links 116 and 110 are illustrated as busses in FIG. 1, any desired type of link may be used. In addition, the elements of FIG. 1 may alternatively be partitioned using more or fewer integrated chips than illustrated in FIG. 1.

Figure 2:
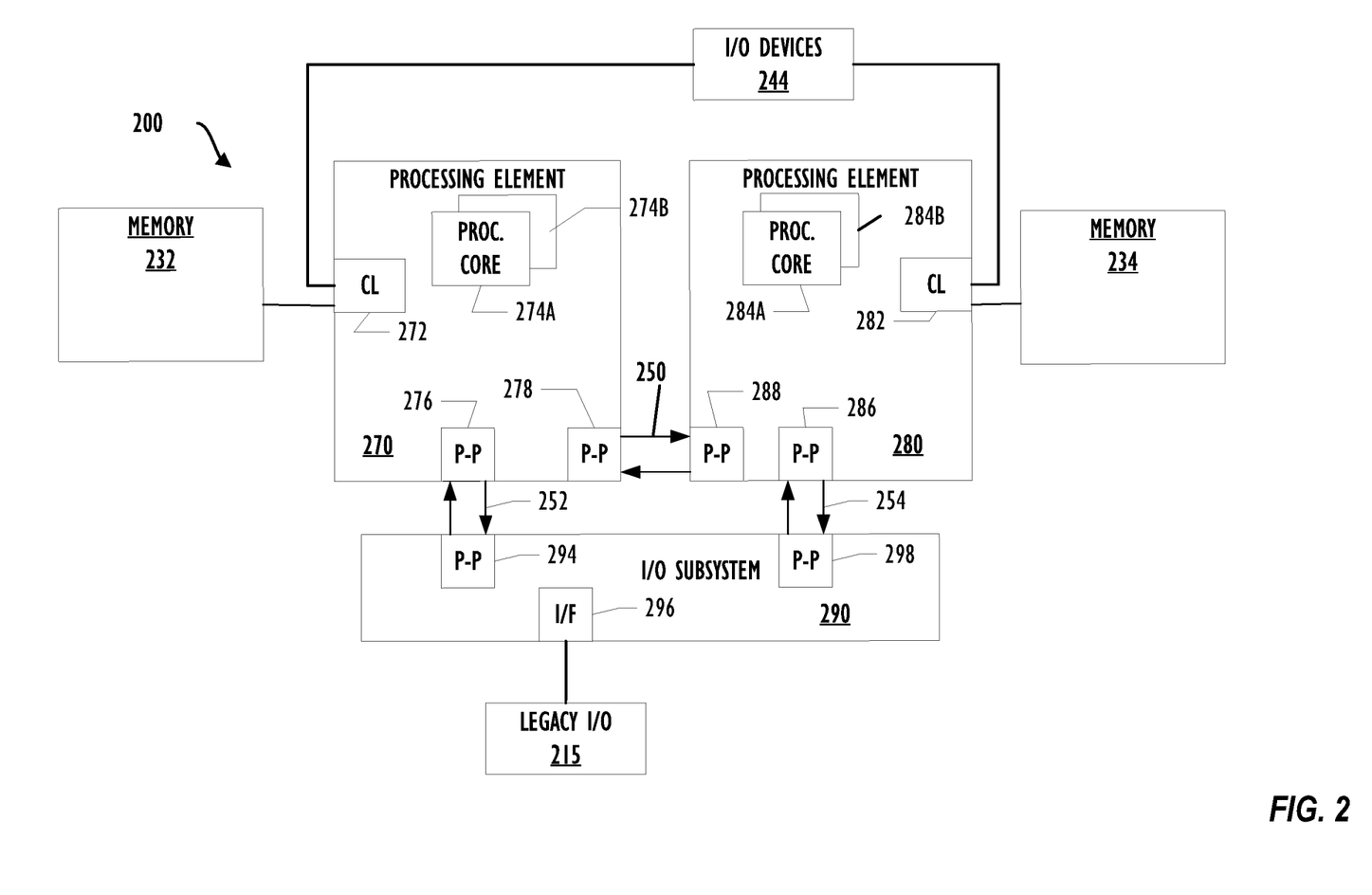
FIG. 2 is an example of a block diagram illustrating a programmable device, according to some embodiments.

Referring now to FIG. 2, a block diagram illustrates a programmable device 200 according to another embodiment. Certain aspects of FIG. 2 have been omitted from FIG. 2 in order to avoid obscuring other aspects of FIG. 2.

FIG. 2 illustrates that processing elements 270 and/or 280 may include integrated memory and I/O control logic ("CL") 272 and 282, respectively, in some embodiments. In some embodiments, the 272, 282 may include memory control logic (MC) such as that described above in connection with FIG. 1. In addition, CL 272 and/or 282 may also include I/O control logic. FIG. 2 illustrates that not only may the memories 232 and/or 234 be coupled to the CL 272 and/or 282, but also that I/O devices 244 may also be coupled to the control logic 272 and/or 282. Legacy I/O devices 215 may be coupled to the I/O subsystem 290 by interface 296. Each processing element 270 and/or 280 may include multiple processor cores, illustrated in FIG. 2 as processor cores 274A and/or 274B, 284A and 284B. As illustrated in FIG. 2, I/O subsystem 290 includes point-to-point (P-P) interconnects 294 and 298 that connect to P-P interconnects 276 and 286 of the processing elements 270 and 280 with links 252 and 254. Processing elements 270 and 280 may also be interconnected by link 250 and interconnects 278 and 288, respectively.

The programmable devices depicted in FIGS. 1 and 2 are schematic illustrations of embodiments of programmable devices that may be utilized to implement various embodiments discussed herein. Various components of the programmable devices depicted in FIGS. 1 and 2 may be combined in a system-on-a-chip (SoC) architecture.

Figure 3:
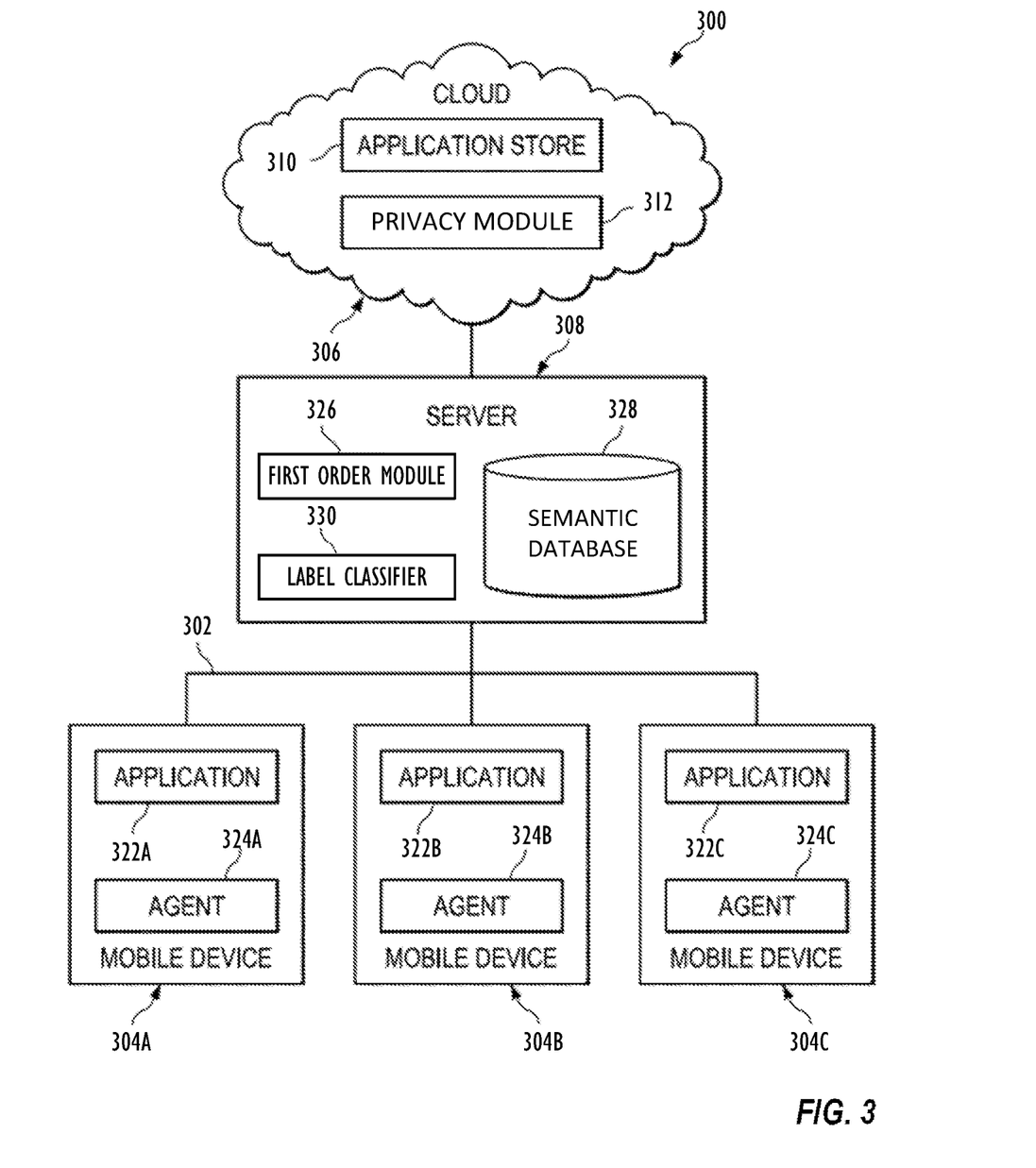
FIG. 3 is an example of a block diagram illustrating components of a system to quantify deviations in app permissions, according to some embodiments.

FIG. 3 is an example of a block diagram illustrating components of a system 300 to quantify deviations in app permissions, according to some embodiments. The exemplary environment illustrates a network 302 connecting one or more mobile devices 304A, 304B, and 304C (collectively 304) with a cloud 306. In one example embodiment, mobile devices 304 may communicate with cloud 306 through server 308. Mobile devices 304, may include of mobile phones, smart mobile phones (smartphones), e-book readers, tablets, iPads, personal digital assistants (PDAs), laptops or electronic notebooks, portable navigation systems, multimedia gadgets (e.g., cameras, video and/or audio players, etc.), gaming systems, other handheld electronic devices, and any other device, component, element, or object capable of initiating voice, audio, video, media, or data exchanges within system 300. Examples of network 302 include a local area network (LAN), a general wide area network (WAN), and/or a public network (e.g., the Internet).

Mobile devices 304 may be provisioned with one or more mobile applications (e.g., one or more respective applications 322A, 322B, and 322C, collectively 322) and respective agents 324A, 324B, and 324C, collectively 324. Agents 324 may monitor behavior and activities of any one or more mobile applications 322 on mobile devices 304. Agents 324 may also access policies stored on the mobile devices 304 to determine if mobile applications 322 violate any policy. Agents 324 may also manage activities of mobile applications 322, for example, by preventing execution of one or more applications based on the respective privacy scores.

Mobile devices 304 may access mobile applications from one or more application stores 310 located in cloud 306. As used herein, "mobile applications" encompass application software that runs on (or is capable of running on) mobile devices and performs specific tasks for the mobile device's user. Mobile applications may include native applications pre-installed on the mobile device, such as address books, calendars, calculators, games, maps and Web browsers. Mobile applications may also be downloaded from various application stores 310. Examples of application stores 310 include mobile application software distribution platforms such as Google® Android Market, Apple® App Store, Palm® Software Store and App Catalog, RIM® App World, etc. Generally, application stores 310 include a submissions process by which mobile applications may be submitted for inclusion to the application store 310.

According to aspects of the present disclosure, a privacy module 312 may be in the cloud 306. Privacy module 312 receives and assesses the privacy implications of apps based upon a description of the app provided by creators of the app. Generally, when an app is submitted to an application store 310, the creators of the app provide a textual description of the features of the app. The textual description is provided to users when the users attempt to obtain or install the app from application store 308. Privacy module 312 may receive the description from, for example, one of agents 324 and output a privacy score. The privacy score is a value which indicates how closely the permissions requested by the app align with permissions expected of an app based on the provided description. Privacy module 312 may interface with components of server 308, for example, sending and receiving data from a semantic database 328, first order module 326, and label classifier 330.

Server 308 may be an enterprise server. In another embodiment, server 308 may be one or more intermediate servers. Although FIG. 3 shows mobile devices 304 communicating with cloud 306 through server 308, this topology is merely representative and other topologies are within scope of this disclosure. As an example, one or more servers may be used for one group of associated mobile devices (e.g., mobile devices on an enterprise, or having a common local communications carrier, etc.); and multiple enterprises or groups of associated mobile devices may connect to cloud 306 through their own one or more servers.

Figure 4:
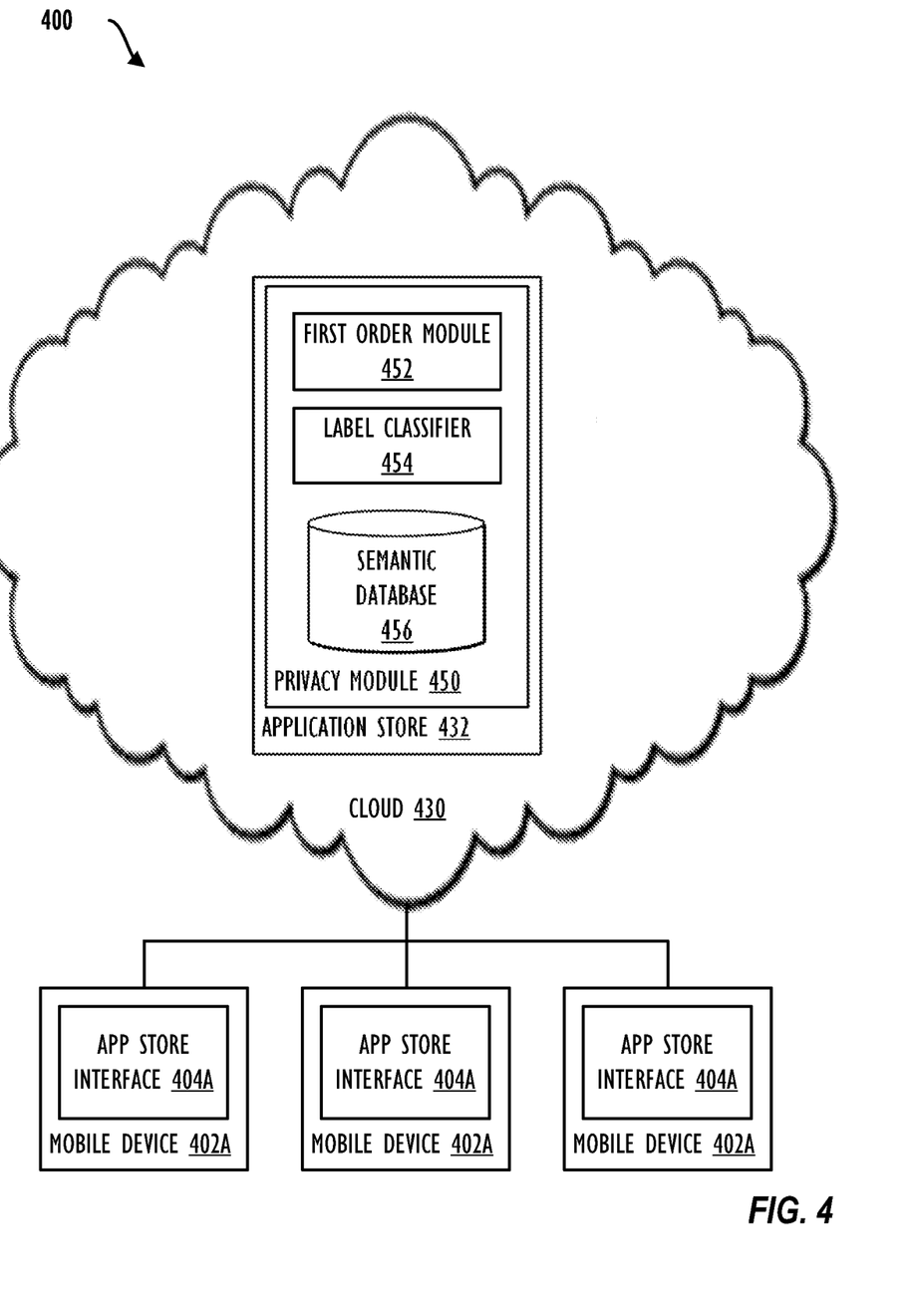
FIG. 4 is an example of a block diagram illustrating a configuration of a system to quantify deviations in app permissions, according to some embodiments.

FIG. 4 is an example of a block diagram illustrating a configuration of a system 400 to quantify deviations in app permissions, according to some embodiments. The exemplary environment illustrates one or more mobile devices 402A, 402B, and 402C (collectively 402), having one or more application store interfaces (e.g., one or more respective application store interfaces 404A, 404B, and 404C, collectively 404) communicating with a cloud 430 via a network. In this example embodiment, cloud 430 may host an application store 432, which includes a privacy module 450 having a first order module 452, a label classifier 454, and a semantic database 456. The privacy module 450 may communicate with the application store interfaces 404 via application store 432. For example, a privacy score may be surfaced by the application store 432 when a user attempts to obtain or install an app.

Figure 5:
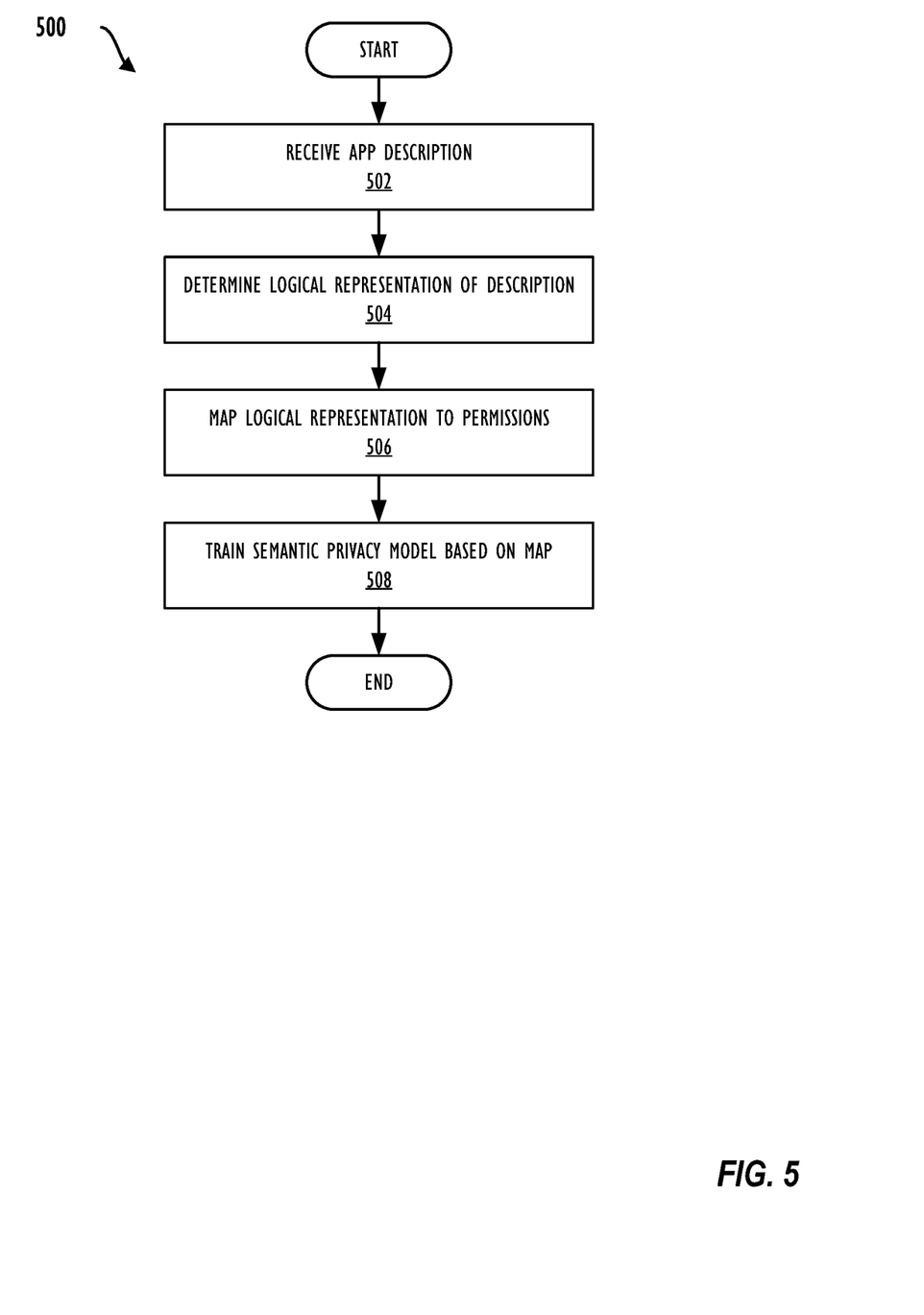
FIG. 5 is an example of a flowchart illustrating a technique to build a sematic privacy model, according to some embodiments.

FIG. 5 is a flowchart illustrating a technique 500 for quantifying deviations in app permissions, according to one embodiment. At block 502, an app description is received, for example, by the privacy module. In some embodiments, an app description can include any suitable text (e.g., describing features of the app, reviews of the app by one or more previous users of the app, and/or any other suitable text). In some embodiments, the app description can be created by any suitable entity, such as a creator of the app.

At block 504, a logical representation of the description is determined. In some embodiments, the logical representation can represent words or combinations of words used in the app description and can be used (as described below in more detail in connection with 506) to determine permissions likely to be used or requested by the app. For example, based on the description provided for certain apps, a user can expect the app to request certain permissions. For example, a user may generally understand, based on a description of a flashlight app, that the app will require permission to access the camera in order to turn on the flash. However, certain permission requirements are more subtle and generally users may not be able to figure out the need for these permissions based on the description.

In some embodiments, permissions likely to be used and/or requested by the app can be determined in any suitable manner and using any suitable technique(s). For example, in some embodiments, permissions may be inferred based on words used in the description by modeling multiple descriptions of apps to map common wordings to permissions. Mathematically, the problem may be defined as determining the set of the set of permissions an app $A_T$ should request based on the description of $A_T$. For an app $A_T$, $A_T \not\in A$, and description $d_T$, and solving for $<p_T>$, where the set of Descriptions, $D=\{d_1, d_2, d_3, \ldots, d_n\}$, a set of apps, $A=\{A_1, A_2, A_3 \ldots A_n\}$ and the set of Permissions $P=\{<p_1>, <p_2>, <p_3>, \ldots <p_n>\}$ requested by the apps in A.

In some embodiments, any suitable technique or combination of techniques can be used to process and/or analyze the app description and/or words used in the app description to generate the logical representation. For example, in some embodiments, the logical representation may be generated by removing stop words and creating a first order logic representation of the description by computing a term frequency-inverse document frequency (TF-IDF). Generally, stop words are the most common words in a language and may include functional words such as the, is, at, which, and on. TF-IDF generally is a numerical statistic which reflects how important a word is to the description as compared to a collection of descriptions. A TF-IDF value for a word generally increases in proportion to how common the word is in the description, adjusted for the fact that some words appear more frequently in general.

At block 506, the logical representation may be mapped to permissions. The first-order logic representation of the description may be mapped to a semantic graph of a permissions model for an operating system of a device, linking words to the various permissions required by the app. For example, the words share, email, or short message system (SMS) may be mapped to a permission for reading contacts. This mapping may be used as a label linking the words to the mapped permission. Note that, in some embodiments, any suitable permissions (e.g., use of a particular messaging client, access to contacts, access to input devices such as a microphone or a camera, access to photos or videos stored on a device, and/or any other suitable permissions) and any suitable number (e.g., two, five, ten, twenty, and/or any other suitable number) can be included in the semantic graph of the permissions model. Additionally, in some embodiments, the logical representation of the app description can be used in any suitable manner to map the logical representation to the permissions. For example, in some embodiments, a subset of words in the app description can be selected based on any suitable criteria prior to mapping to permissions. As a more particular example, in some embodiments, the subset of words in the app description can be selected based on importance and/or relevance (e.g., determined based on the TF-IDF analysis described above, and/or determined based on any other suitable information).

At block 508, the mapping can be used to train a model that can be used, for example, to determine permissions likely to be used and/or requested by an app based on an app description (e.g., as described below in connection with FIG. 6). In some embodiments, any suitable model can be used, such as a semantic privacy model. In some such embodiments, the semantic privacy model can include any suitable type of algorithm(s), such as a multi-label classifier. Continuing with this example, in some embodiments, a multi-label classifier can be trained in any suitable manner, for example, by associating labels determined based on the app description with available permissions based on the mapping. The multi-label classifier takes the labeled words and app permissions and updates a model associating various words with various permissions across the set of descriptions. Generally, mappings from descriptions from a set of descriptions may be used to train the semantic privacy model. The semantic privacy model associates repeated mappings of word to permissions across the set of descriptions to determine associations between words and permissions generally for the set of descriptions. For example, where multiple app descriptions having the word friends linked to the permission label read contacts, the semantic privacy model associates friends with the permission read contacts.

Figure 6:
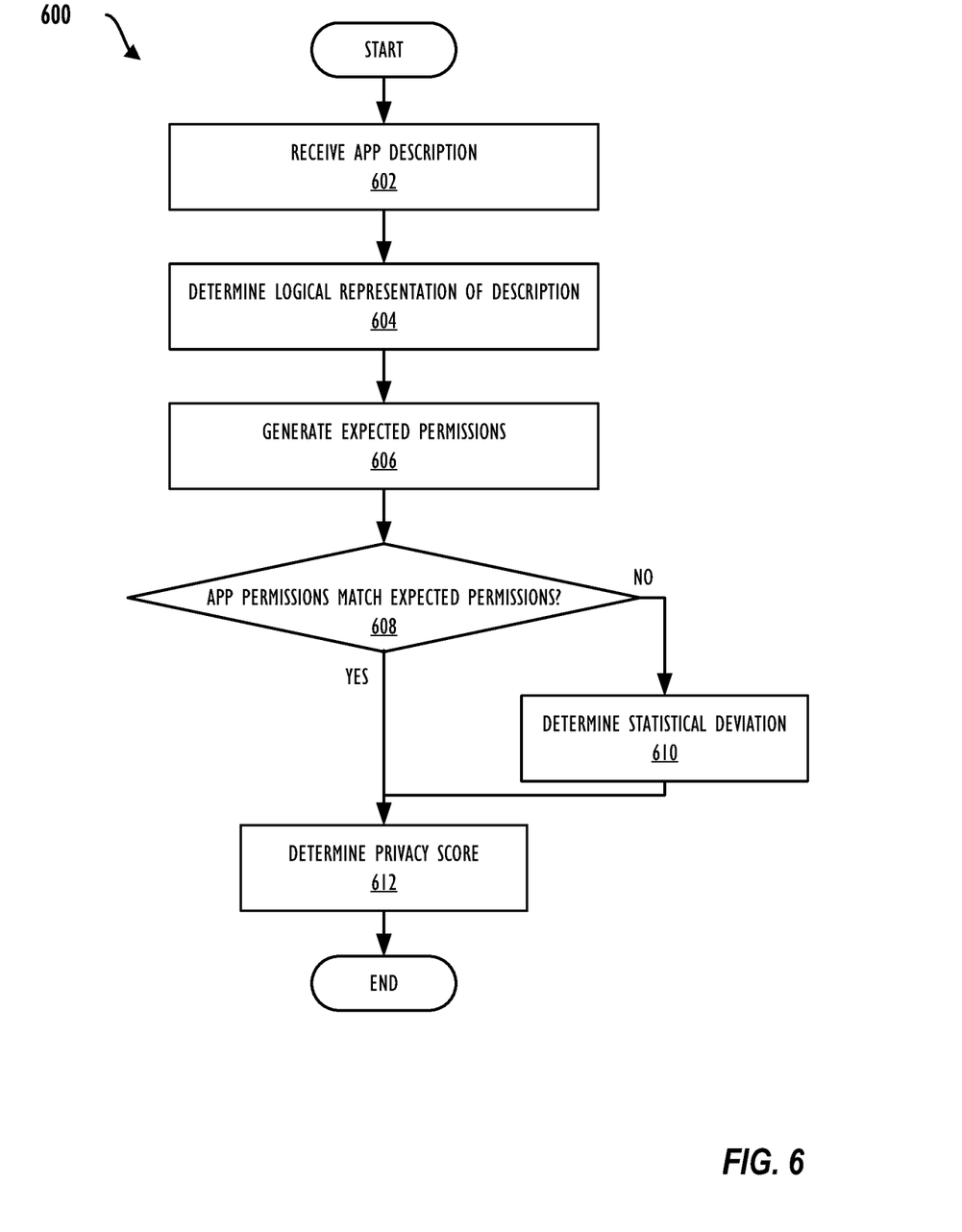
FIG. 6 is an example of a flowchart illustrating a technique to quantify deviations in app permissions, according to some embodiments.

FIG. 6 is a flowchart illustrating a technique 600 to quantify deviations in app permissions, according to one embodiment.

At block 602, an app description is received, for example, by the privacy module. As described above, in some embodiments, an app description can include any suitable text or other suitable content.

At block 604, a logical representation of the description is determined. In some embodiments, the logical representation of the app description can include any suitable information, such as an indication of a relevance and/or an importance of words included in the app description, as described above in connection with 504 of FIG. 5. In some embodiments, any suitable technique or combination of techniques can be used to determine the logical representation, as described above in connection with 504 of FIG. 5.

At block 606, a set of expected permissions are generated based on the logical representation of the description. In some embodiments, expected permissions can be generated using any suitable technique or combination of techniques. For example, in some embodiments, a first order logical representation (e.g., as determined at block 604) may be submitted to a trained semantic privacy model (e.g., as described above in connection with 508 of FIG. 5) as an input. The semantic privacy model, based on the logical representation and the trained semantic privacy model, performs a multi-label classification of the logical representation and outputs a set of permissions that are expected based on the words of the description. In some embodiments, any suitable number of permissions (e.g, two, five, ten, and/or any other suitable number) can be included in the set of permissions. In some embodiments, the permissions included in the set of permissions can include any permissions likely to be used and/or requested by the app associated with the app description, such as access to an input device (e.g., a microphone, a camera, and/or any other suitable input devices), access to data stored on a device (e.g., stored photos and/or videos, contacts, and/or any other suitable data), access to other applications on the device (e.g., a particular messaging client, and/or any other suitable applications), and/or any other suitable permissions.

At block 608, the expected permissions are compared with permissions required by the app. In some embodiments, permissions required by the app can be indicated in any suitable manner. For example, in some embodiments, permissions required by the app can be indicated by a creator of the app at a time when the app is submitted to an app store.

If the required permissions match ("yes" at 608), or are less than, the expected permissions, the privacy implications of the app may be determined, at block 612, to be consistent with other apps having similar features and a privacy score reflecting this may be returned. For example, a higher privacy score may be associated with apps that require no more permissions than other similar apps, and this higher privacy score may be returned. As a more particular example, in an instance of an app that has expected permissions of access to a camera of a user device and access to contacts on the user device, and required permissions of the app include access to the camera, it can be determined that the app requires fewer permissions than the expected permissions, and therefore, that the app is to be assigned a relatively higher privacy score.

Conversely, where there are required permissions that are not expected ("no" at 608), at block 610, a statistical deviation between the required permissions and expected permissions is calculated. This statistical deviation may be calculated, for example, using a statistical model such as a Jaccardian Similarity or Sorenson-Dice Coefficient models. In some embodiments, the statistical deviation can indicate any suitable information, such as a magnitude of difference between the required permissions and the expected permissions, an importance of the difference between the required permissions and the expected permissions, and/or any other suitable information. After calculation, the deviation may be mapped to the privacy score (e.g., as described above in connection with 612) and returned. Generally, privacy scores with a mapped deviation are lower than those of apps that require no more permissions than other similar apps.

In some embodiments, the value of a privacy score may be one or more of an alphanumeric value, color, or other representation. In some embodiments, the privacy score may be returned and displayed to a user, for example, within a user interface used to select the app for purchase and/or for download to a user device. The user may then use the privacy score to determine the intent of the app and whether to install the app.

In some embodiments, the privacy score can be used to evaluate a submission to an application store. For example, creators of an app may submit the app to an application store. The application store may determine a privacy score for the app and, for example, warn users or the creators of the app when the determined privacy score is below a certain threshold. In some cases, the application store may reject an app when the determined privacy score is below some threshold.

In some embodiments, a privacy score can be used for any other suitable purpose. For example, in some embodiments, an application can be rejected for installation based on the privacy score. As a more particular example, in some embodiments, a user device on which a user has selected a particular application for installation on the user device can reject the application for installation on the user device if the privacy score is below a predetermined threshold. As another more particular example, in some embodiments, any other suitable device, such as a device used for administering a computer network, can reject an application for installation on a user device while the user device is connected to the computer network in response to determining the privacy score associated with the application is below a predetermined threshold. As another example, in some embodiments, an application can be granted permission for installation on a user device in response to determining that the privacy score exceeds a predetermined threshold, thereby causing the application to be installed on the user device. As yet another example, in some embodiments, an application can be automatically granted permission (i.e., without user input) to access any suitable features requested by the application (e.g., a camera of a user device, a contacts list stored on a user device, and/or any other suitable features) in response to determining that a privacy score associated with the application exceeds a predetermined threshold. As still another example, in some embodiments, an application can automatically be denied permission (i.e., without user input) to access features requested by the application in response to determining that a privacy score associated with the application is below a predetermined threshold. Note that, in some embodiments, in instances where an application is denied access to particular features of a user device based on a privacy score, access to the features can be granted explicitly by a user of the user device.

Note that, in some embodiments, a statistical deviation (e.g., as calculated at 610) can be used to update and/or modify the semantic privacy model described above in connection with 606 and 508 of FIG. 5. For example, in an instance where a statistical deviation exceeds a predetermined threshold, the logical representation for a corresponding app description can be manually evaluated in association with corresponding permissions, to determine if a new training sample for the semantic privacy model is to be created to update training of the model.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by a computer system.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A method for controlling installation of an application, comprising:
    receiving at a hardware processor a description of an application to be installed on a user device and a group of permissions required by the application;
    determining, using the hardware processor, a logical representation of the description by removing stop words and creating a first order logic representation of the description by computing a term frequency-inverse document frequency;
    determining, using the hardware processor, an expected group of permissions based on the logical representation of the description;
    comparing, using the hardware processor, the group of permissions required by the application and the expected group of permissions;
    determining, using the hardware processor, a privacy score associated with the application based on the comparison of the group of permissions required by the application and the expected group of permissions;
    determining, using the user device, that the privacy score does not meet a privacy threshold; and
    in response to determining that the privacy score does not meet a privacy threshold, rejecting, by the user device, the application for installation on the user device after the user has selected the application for installation.

2. The method of claim 1, wherein the group of permissions required by the application includes a plurality of permissions, and wherein each permission in the group of permissions indicates a feature of the user device to be used by the application.

3. The method of claim 1, wherein determining the expected group of permissions based on the logical representation of the description comprises using the logical representation of the description as an input to a classifier, wherein the expected group of permissions is an output of the classifier.

4. The method of claim 1, further comprising causing an indication of the privacy score to be presented on the user device.

5. The method of claim 1, further comprising:
    determining, based on the comparison of the group of permissions required by the application and the expected group of permissions, that a difference between the group of permissions required by the application and the expected group of permissions exceeds the predetermined threshold; and
    in response to determining that the difference between the group of permissions required by the application and the expected group of permissions exceeds the predetermined threshold, calculating a deviation score, wherein the privacy score is based on the deviation score.

6. A system for determining application permissions, the system comprising:
    a hardware processor that is configured to:
        receive a description of an application to be installed on a user device and a group of permissions required by the application;
        determine a logical representation of the description by removing stop words and creating a first order logic representation of the description by computing a term frequency-inverse document frequency;
        determine an expected group of permissions based on the logical representation of the description;
        compare the group of permissions required by the application and the expected group of permissions; and
        determine a privacy score associated with the application based on the comparison of the group of permissions required by the application and the expected group of permissions; and
    a user device that is configured to:
        determine that the privacy score does not meet a privacy threshold; and
        in response to determining that the privacy score does not meet a privacy threshold, reject the application for installation on the user device after the user has selected the application for installation.

7. The system of claim 6, wherein the group of permissions required by the application includes a plurality of permissions, and wherein each permission in the group of permissions indicates a feature of the user device to be used by the application.

8. The system of claim 6, wherein determining the expected group of permissions based on the logical representation of the description comprises using the logical representation of the description as an input to a classifier, wherein the expected group of permissions is an output of the classifier.

9. The system of claim 6, wherein the hardware processor is further configured to cause an indication of the privacy score to be presented on the user device.

10. The system of claim 6, wherein the hardware processor is further configured to:
    determine, based on the comparison of the group of permissions required by the application and the expected group of permissions, that a difference between the group of permissions required by the application and the expected group of permissions exceeds the predetermined threshold; and in response to determining that the difference between the group of permissions required by the application and the expected group of permissions exceeds the predetermined threshold, calculate a deviation score, wherein the privacy score is based on the deviation score.

\* \* \* \* \*